United States Patent
Ardo et al.

(10) Patent No.: US 10,110,802 B2
(45) Date of Patent: Oct. 23, 2018

(54) HISTORICAL GAZE HEAT MAP FOR A VIDEO STREAM

(71) Applicant: Axis AB, Lund (SE)

(72) Inventors: Bjorn Ardo, Lund (SE); Fredrik Pihl, Malmo (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/395,893

(22) Filed: Dec. 30, 2016

(65) Prior Publication Data

US 2018/0191952 A1      Jul. 5, 2018

(51) Int. Cl.
| | |
|---|---|
| H04N 5/228 | (2006.01) |
| H04N 5/232 | (2006.01) |
| G06F 3/01 | (2006.01) |
| G06K 9/00 | (2006.01) |

(52) U.S. Cl.
CPC ......... *H04N 5/23219* (2013.01); *G06F 3/013* (2013.01); *G06K 9/00604* (2013.01); *H04N 5/23229* (2013.01); *H04N 5/23293* (2013.01)

(58) Field of Classification Search
CPC .................................................. H04N 5/23219
USPC ....................................................... 348/222.1
See application file for complete search history.

(56) References Cited

U.S. PATENT DOCUMENTS

| | | | |
|---|---|---|---|
| 4,513,317 A | 4/1985 | Ruoff, Jr. | |
| 5,703,637 A | 12/1997 | Miyazaki et al. | |
| 6,717,607 B1 | 4/2004 | Lauper et al. | |
| 2011/0006978 A1* | 1/2011 | Yuan | G06F 3/013 345/156 |
| 2011/0019096 A1* | 1/2011 | Lee | H04N 5/205 348/607 |
| 2011/0273621 A1 | 11/2011 | Richardson et al. | |
| 2012/0133770 A1* | 5/2012 | Joao | G01C 21/3691 348/149 |
| 2012/0146891 A1 | 6/2012 | Kalinli | |
| 2014/0092006 A1 | 4/2014 | Boelter et al. | |
| 2015/0036736 A1 | 2/2015 | Lundberg | |
| 2016/0132106 A1* | 5/2016 | Yoon, II | G06F 3/013 345/158 |
| 2016/0203524 A1* | 7/2016 | Kim | G06Q 30/0269 705/14.58 |
| 2016/0291690 A1* | 10/2016 | Thorn | H04N 5/232 |

(Continued)

OTHER PUBLICATIONS

T H Reeves and J A Robinson, Adaptive Foveation of MPEG Video, Apr. 25, 2017, 11 pages.

(Continued)

*Primary Examiner* — Usman Khan
(74) *Attorney, Agent, or Firm* — Snyder, Clark, Lesch & Chung, LLP

(57) ABSTRACT

A method and a video management system is disclosed. The method may include receiving a video stream from a camera and displaying the video stream on a display. The method may include obtaining, via an eye tracking sensor, gaze information for an operator watching the display. The method may include generating a historical gaze heat map for the video stream for a time period based on the obtained gaze information and determining a low interest area for the video stream based on the generated historical gaze heat map. The method may include instructing the camera to decrease a bit rate of the video stream in the low interest area.

20 Claims, 10 Drawing Sheets

(56) References Cited

U.S. PATENT DOCUMENTS

2017/0236466 A1* 8/2017 Spitzer ................ G09G 3/2085
345/560

OTHER PUBLICATIONS

"This is Eye Tracking," Tobii Group, <http://www.tobii.com/group/about/this-is-eye-tracking/>, accessed Dec. 29, 2016.
Robillard, Julie, "How to Create a Heatmap," Gazepoint, <http://www.gazept.com/faq-items/heatmap/>, Jan. 1, 2014, accessed Dec. 29, 2016.
"Video compression picture types," Wikipedia, <https://en.wikipedia.org/wiki/Video_compression_picture_types>, accessed Dec. 29, 2016.

* cited by examiner

HISTORICAL GAZE HEAT MAP FOR A VIDEO STREAM

BACKGROUND

A monitoring device, such as a camera, may be installed to capture images or video of an area of interest. An operator, or a group of operators, may monitor images or video from the camera on a display that is located remotely from the camera. The data captured by the camera may be processed and sent over a network connection to the display. For example, the images or video may be compressed in order to reduce the amount of data that has to be transmitted across a network. A system may include a large number of cameras transmitting a large amount of data across a network. The large amount of data may tax the resources of the network.

SUMMARY

According to one aspect, a method, performed by a computer device, may include receiving a video stream from a camera; displaying the video stream on a display; obtaining, via an eye tracking sensor, gaze information for an operator watching the display; generating a historical gaze heat map for the video stream for a time period based on the obtained gaze information; determining a low interest area for the video stream based on the generated historical gaze heat map; and instructing the camera to decrease a bit rate of the video stream in the low interest area.

Additionally, the method may include determining a high interest area of the video stream based on the generated historical gaze heat map; and instructing the camera to increase a bit rate of the video stream in the high interest area.

Additionally, the time period may be longer than a day.

Additionally, the time period may correspond to a particular time of a day or a particular day of week, and determining the low interest area of the video stream based on the generated historical gaze heat map may include determining a first low interest area for a first time of day or day of week based on a historical gaze heat map generated for the first time of day or day of week over multiple instances of the first time of day or day of week; and determining a second low interest area for a second time of day or day of week, wherein the second low interest area is different from the first low interest area based on a historical gaze heat map generated for the second time of day or day of week over multiple instances of the second time of day or day of week.

Additionally, determining a low interest area of the video stream based on the generated historical gaze heat map may include identifying a pan, zoom, tilt, rotation, or image type setting for the camera; selecting a subset of the generated historical gaze heat map associated with the identified pan, zoom, tilt, rotation, or image type setting for the camera; and determining the low interest area of the video stream based on the selected subset of the generated historical gaze heat map.

Additionally, the video stream may include a plurality of video streams and wherein the display includes a plurality of displays.

Additionally, the method may include associating an event type with a particular change in the historical gaze heat map; detecting an event of the associated event type; and changing the low interest area based on the particular change in the historical gaze heat map, in response to detecting the event.

Additionally, instructing the camera to decrease the bit rate of the video stream in the low interest area may include instructing the camera to reduce a sampling rate for a sensor associated with the low interest area.

Additionally, instructing the camera to decrease the bit rate of the video stream in the low interest area may include instructing the camera to increase a noise reduction process for the low interest area prior to encoding the video stream.

Additionally, instructing the camera to decrease the bit rate of the video stream in the low interest area may include instructing the camera to adjust an encoding parameter for an encoding processing unit associated with the low interest area.

According to another aspect, a computer system may include a memory to store instructions; and a receiver to receive a video stream from a camera; a display to display the video stream; a processor configured to execute the instructions to obtain, via an eye tracking sensor, gaze information for an operator watching the display, generate a historical gaze heat map for the video stream for a time period based on the obtained gaze information, determine a low interest area for the video stream based on the generated historical gaze heat map, and determine to instruct the camera to decrease a bit rate of the video stream in the low interest area; and a transmitter to send an instruction to the camera to decrease the bit rate of the video stream in the low interest area.

Additionally, the processor may be further configured to determine a high interest area of the video stream based on the generated historical gaze heat map; and the processor may be configured to determine to instruct the camera to increase a bit rate of the video stream in the high interest area, and transmitter may be configured to send an instruction to the camera to increase the bit rate of the video stream in the high interest area.

Additionally, the time period may be longer than a day.

Additionally, the time period may correspond to a particular time of a day or a particular day of week, and the processor may be further configured to determine a first low interest area for a first time of day or day of week based on a historical gaze heat map generated for the first time of day or day of week over multiple instances of the first time of day or day of week; and determine a second low interest area for a second time of day or day of week, wherein the second low interest area is different from the first low interest area based on a historical gaze heat map generated for the second time of day or day of week over multiple instances of the second time of day or day of week.

Additionally, the processor may be further configured to identify a pan, zoom, tilt, rotation, or image type setting for the camera; select a subset of the generated historical gaze heat map associated with the identified pan, zoom, tilt, rotation, or image type setting for the camera; and determine the low interest area of the video stream based on the selected subset of the generated historical gaze heat map.

Additionally, the video stream may include a plurality of video streams and the display may include a plurality of displays.

Additionally, the processor may be further configured to associate an event type with a particular change in the historical gaze heat map; detect an event of the associated event type; and change the low interest area based on the particular change in the historical gaze heat map, in response to detecting the event.

Additionally, the processor may be further configured to determine to instruct the camera to reduce a sampling rate for a sensor associated with the low interest area; and the instruction to decrease the bit rate of the video stream in the low interest area may include an instruction to the camera to reduce the sampling rate for the sensor associated with the low interest area.

Additionally, the processor may be further configured to determine to instruct the camera to increase a noise reduction process for the low interest area prior to encoding the video stream; and the instruction to decrease the bit rate of the video stream in the low interest area may include an instruction to increase the noise reduction process for the low interest area prior to encoding the video stream.

Additionally, the processor may be further configured to determine to instruct the camera to adjust an encoding parameter for an encoding processing unit associated with the low interest area, and the instruction to decrease the bit rate of the video stream in the low interest area may include an instruction to adjust the encoding parameter for the encoding processing unit associated with the low interest area.

DETAILED DESCRIPTION

Figure 1:
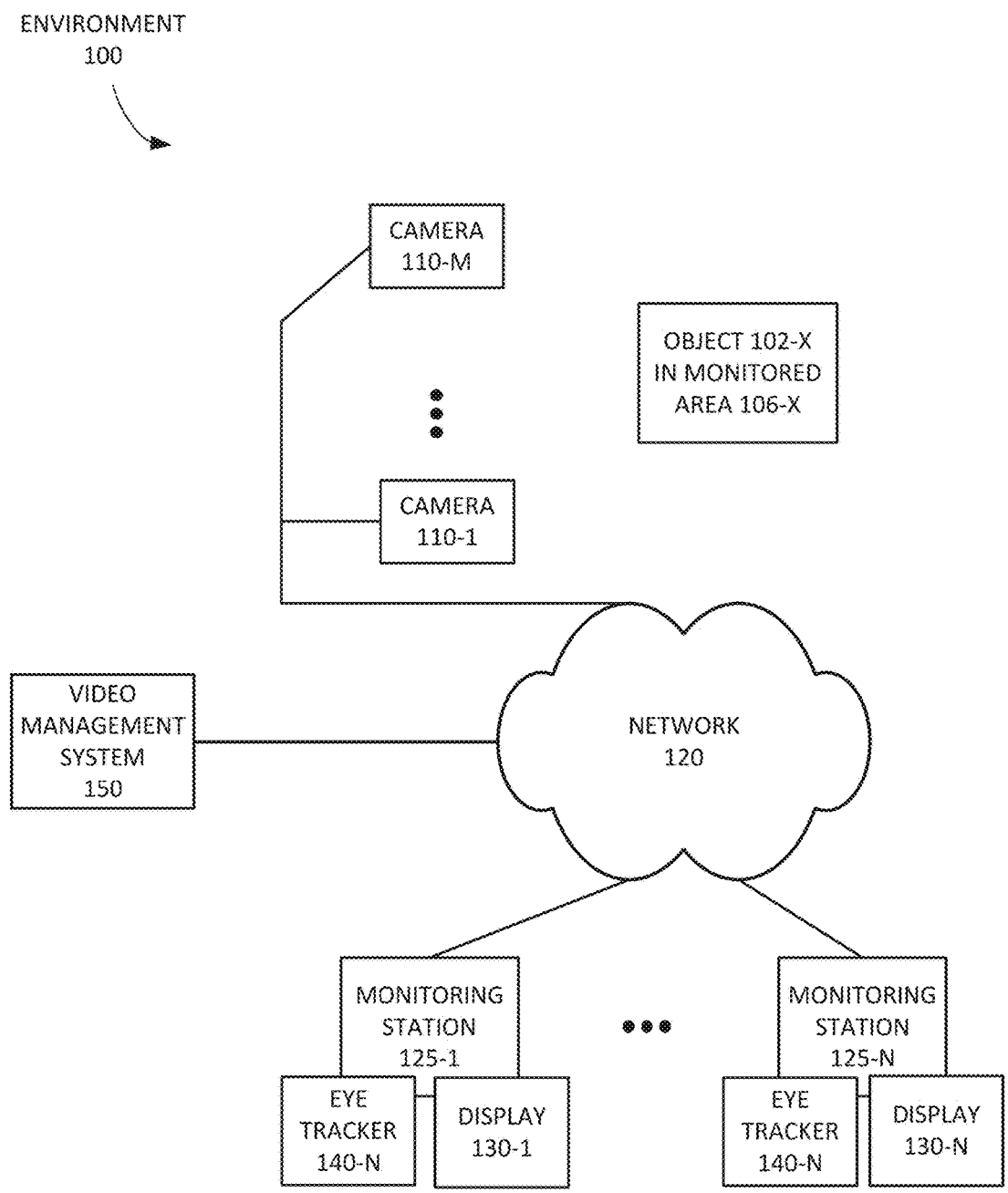
FIG. 1 is a block diagram illustrating an exemplary environment including eye tracking according to an implementation described herein.

The following detailed description refers to the accompanying drawings. The same reference numbers in different drawings identify the same or similar elements.

Implementations described herein relate to a gaze heat map. A monitoring camera streams video of an area of interest to a display. Video streams may have high bandwidth requirements and may consume significant network bandwidth. Furthermore, processing a video stream may require processor and memory resources. A person watching the display, referred to herein as an "operator" or "user," may find particular areas of a scene shown on the display to be of high interest and may find other areas of the scene to be of low interest. For example, if the camera is monitoring an area with a path and a door, the operator may spend a significant amount of time watching the door and the path, and may spend a relatively low amount of time watching the wall around the door.

An eye tracker may be used to identify the operator's gaze area and therefore to identify a portion of the display, or one or more displays in a group of displays, at which the operator is looking. Over a period of time, a historical gaze heat map may be generated that indicates the amount of time that the operator spends looking at particular locations on a display showing a video stream from a particular camera over a particular time period. The time period may be selected based on an expected variability in the video stream. In some implementations, the time period may be at least one day. In other implementations, the time period may be longer than a day (e.g., one week, one month, etc.).

The historical gaze heat map may, for example, assign a value to each pixel, or set of pixels, in a frame of a video stream, with the assigned value representing the length of time for which the operator's gaze point corresponded to the pixel, or set of pixels. For example, a higher assigned value to a pixel, or set of pixels, may correspond to a longer amount of time spent by the operator looking at the location of the video stream frame corresponding to the pixel, or set of pixels.

The historical gaze heat map may be used to determine a low interest area for the video stream and the camera may be instructed to decrease a bit rate of the video stream in the low interest area. Reducing the bit rate of a video stream in a low interest area of the video stream may result in the technical effect of conserving network resources and reducing processor and memory load for a monitoring system of cameras and monitoring stations. In some implementations, the video stream may include multiple video streams and the display may include multiple displays.

Furthermore, in some implementations, a high interest area for the video stream may be determined based on the historical gaze heat map and the camera may be instructed to increase a bit rate of the video stream in the high interest area.

The historical gaze heat map may store additional information for particular data points and the additional information may be used to refine the gaze heat map with respect to a particular parameter. As an example, for each location (e.g., pixel, set of pixels, etc.) of the video stream in the gaze heat map, the additional information may include information identifying a particular time of day or a particular day of week when the gaze information was collected. Thus, gaze heat maps for different times of day or days of the week may be retrieved from the historical gaze heat map based on multiple instances of gaze information being collected for the video stream for a particular time of day or day of week. Thus, for example, a first low interest area may be determined for a first time of day or day of week based on a historical gaze heat map generated for the first time of day or day of week over multiple instances of the first time of day or day of week, and a second low interest area may be generated for a second time of day or day of week, based on a historical gaze heat map generated for the second time of day or day of week over multiple instances of the second time of day or day of week.

As another example, for each location of the video stream in the gaze heat map, the additional information may include information identifying a particular camera setting when the gaze information was collected. Thus, gaze heat maps for different camera settings may be retrieved from the historical gaze heat map. For example, a pan, zoom, tilt, rotation, or image type (e.g., normal vs. wide angle, etc.) setting for the camera may be selected, a subset of the historical gaze heat map may be generated based on the camera setting selection, and a low interest area of the video stream for the selected camera setting may be determined based on the gaze heat map subset.

As yet another example, for each location of the video stream in the gaze heat map, the additional information may include information identifying a particular event type. An event type may be identified based on a generated alarm, based on an event recorded in a calendar associated with a monitored area and managed by a video management system, based on manual information entered by the operator, and/or based on another technique of identifying an event. An event type may be associated with a particular change in the historical gaze heat map. If the event type is detected in the future, the low interest area may be changed based on the associated change in the historical gaze heat map. For example, a door sensor may indicate that a door has been opened and the operator's gaze may change to an area associated with the door within a particular time of the door sensor being activated. After an association with the door sensor is made, if the door sensor is activated in the future, a low interest area associated with the door may be changed to a high interest area and a bit rate for the door are may be increased.

The bit rate may be reduced at any of a number of points along a processing path from the point of capture of the video data by a sensor array to transmitting an encoded video stream to the display via a network connection. As an example, instructing the camera to decrease the bit rate of the video stream in the low interest area may include instructing the camera to reduce a sampling rate for a sensor associated with the low interest area. As another example, instructing the camera to decrease the bit rate of the video stream in the low interest area may include instructing the camera to lower resolution for the low interest area prior to encoding the video stream. As yet another example, instructing the camera to decrease the bit rate of the video stream in the low interest area may include instructing the camera to increase a noise reduction process for the low interest area prior to encoding the video stream. As yet another example, instructing the camera to decrease the bit rate of the video stream in the low interest area may include instructing the camera to increase a compression parameter value for an encoding processing unit associated with the low interest area.

FIG. 1 is a block diagram illustrating an exemplary environment 100 in an embodiment. Environment 100 may be, for example, a monitoring system to secure an area or provide public safety. As shown in FIG. 1, environment 100 may include cameras 110-1 through 110-M, network 120, monitoring stations 125-1 through 125-N, displays 130-1 through 130-N, eye trackers 140-1 through 140-N, and/or a video management system (VMS) 150.

Cameras 110-1 through 110-M (individually "camera 110," or plural "cameras 110") capture images and/or video of monitored areas 106. A monitored area 106 may be monitored by one or more cameras 110. For example, two cameras can monitor area 106-1, which includes an object 102-1. Objects 102 may include any object, such as a door, a person, an animal, a vehicle, a license plate on a vehicle, etc.

Camera 110 may capture image data using visible light, infrared light, and/or other non-visible electromagnetic radiation (e.g., ultraviolet light, far infrared light, terahertz radiation, microwave radiation, etc.). Camera 110 may include a thermal camera and/or a radar device for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 may include sensors that generate data arranged in one or more two-dimensional array(s) (e.g., image data or video data). As used herein, "video data" and "video" may be referred to more generally as "image data" and "image," respectively. Thus, "image data" or an "image" is meant to include "video data" and "videos" unless stated otherwise. Likewise, "video data" or a "video" may include a still image unless stated otherwise. Furthermore, in some implementations, "video data" may include audio data.

Monitoring stations 125-1 through 125-N may include computer devices that are clients of VMS 150 and that are coupled to displays 130-1 through 130-N (individually "monitoring station 125" and "display 130," respectively). In an embodiment, monitoring stations 125-1 through 125-N are also coupled to eye trackers 140-1 through 140-N (individually "eye tracker 140"). Monitoring station 125 and display 130 enable operators (not shown in FIG. 1) to view images from cameras 110. Eye tracker 140 tracks the gaze of an operator viewing display 130. Each monitoring station 125, display 130, and eye tracker 140 may be a "client" for an operator to interact with the monitoring system shown in environment 100.

Display 130 receives and displays video stream(s) from one or more cameras 110. A single display 130 may show images from a single camera 110 or from multiple cameras 110 (e.g., in multiple frames or windows on display 130). A single display 130 may also show images from a single camera but in different frames. That is, a single camera may include a wide-angle or fisheye lens, for example, and provide images of multiple areas 106. Images from the different areas 106 may be separated and shown on display 130 separately in different windows and/or frames. Display 130 may include a liquid-crystal display (LCD), a light-emitting diode (LED) display, an organic LED (OLED) display, a cathode ray tube (CRT) display, a plasma display, a laser video display, an electrophoretic display, a quantum-dot display, a video projector, and/or any other type of display device.

Eye tracker 140 includes a sensor (e.g., a camera) that enables VMS 150 (or any other device in environment 100) to determine where the eyes of an operator are focused. For example, a set of near-infrared light beams may be directed at an operator's eyes, causing reflections in the operator's corneas. The reflections may be tracked by a camera included in eye tracker 140 to determine the operator's gaze area. The gaze area may include a gaze point and an area of foveal focus. For example, an operator may sit in front of display 130 of monitoring station 125. Eye tracker 140 determines which portion of display 130 the operator is focusing on. Each display 130 may be associated with a single eye tracker 140. Alternatively, an eye tracker 140 may correspond to multiple displays 130. In this case, eye tracker 140 may determine which display and/or which portion of that display 130 the operator is focusing on.

Eye tracker 140 may also determine the presence, a level of attention, focus, drowsiness, consciousness, and/or other states of a user. Eye tracker 140 may also determine the identity of a user. The information from eye tracker 140 can be used to gain insights into operator behavior over time or determine the operator's current state. In some implementations, display 130 and eye tracker 140 may be implemented in a virtual reality (VR) headset worn by an operator.

The operator may perform a virtual inspection of area 106 using one or more cameras 110 as input into the VR headset.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

VMS 150 may include one or more computer devices, such as, for example, server devices, which coordinate operation of cameras 110, display devices 130, and/or eye tracking system 140. VMS 150 may receive and store image data from cameras 110. VMS 150 may also provide a user interface for operators of monitoring stations 125 to view image data stored in VMS 150 or image data streamed from cameras 110. VMS 150 may include a rule engine to conserve system resources by instructing cameras 110 to reduce a bit rate for a region that is outside the operator's gaze area.

In some embodiments, environment 100 does not include a separate VMS 150. Instead, the services provided by VMS 150 are provided by monitoring stations 125 (e.g., computer devices associated with displays 130) and/or cameras 110 themselves or in a distributed manner among the devices in environment 100. For example, cameras 110 may include a rule engine to conserve system resources by instructing cameras 110 to reduce a bit rate for a region that is outside the operator's gaze area. Similarly, VMS 150 may perform operations described as performed by camera 110.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
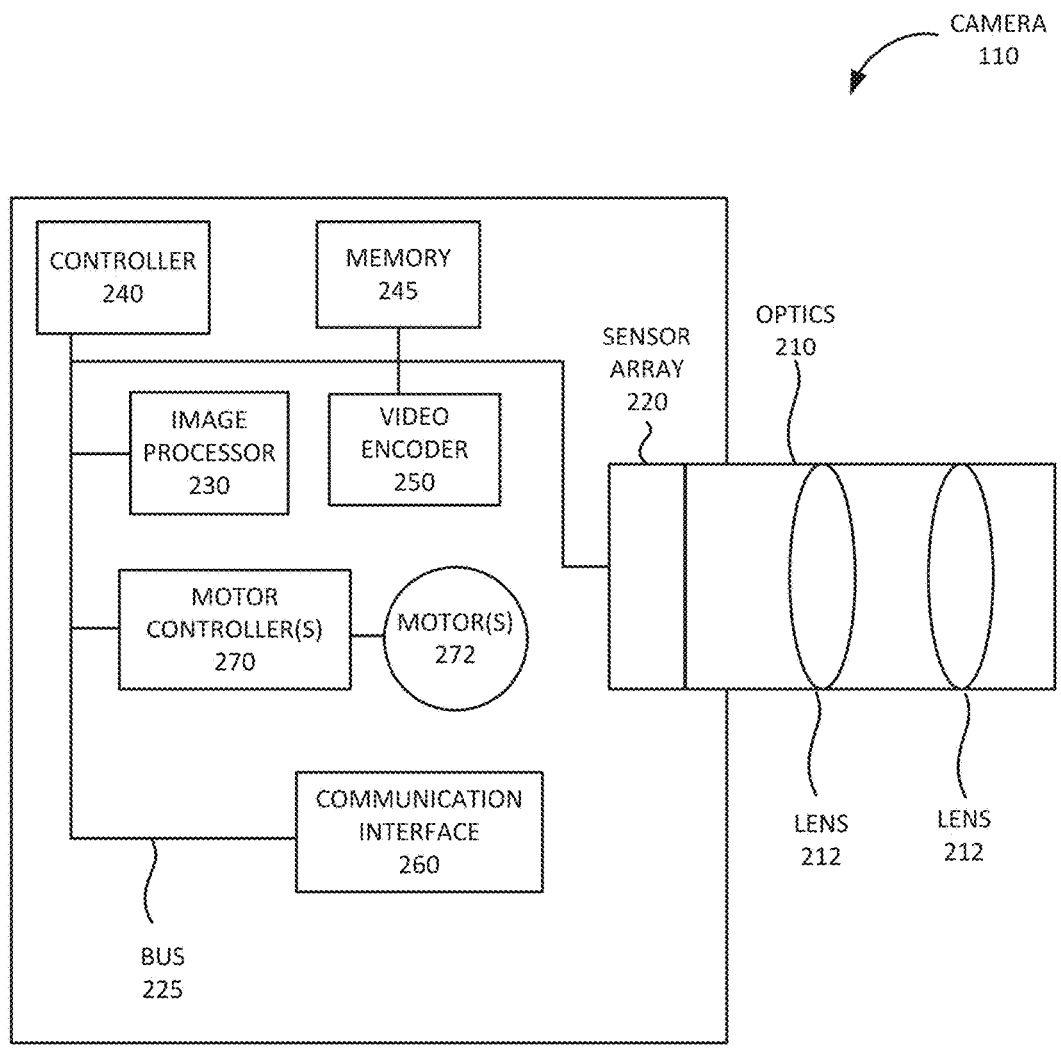
FIG. 2 is a block diagram illustrating exemplary components of a camera according to an implementation described herein.

FIG. 2 is a block diagram illustrating exemplary components of a camera 110 in an embodiment. As shown in FIG. 2, camera 110 may include an optics chain 210, a sensor array 220, a bus 225, an image processor 230, a controller 240, a memory 245, a video encoder 250, and/or a communication interface 260. In an embodiment, camera 110 may include one or more motor controllers 270 (e.g., three) and one or more motors 272 (e.g., three) for panning, tilting, rotating, and/or zooming camera 110.

Optics chain 210 includes an enclosure that directs incident radiation (e.g., light, visible light, infrared waves, millimeter waves, etc.) to a sensor array 220 to capture an image based on the incident radiation. Optics chain 210 includes one or more lenses 212 collect and focus the incident radiation from a monitored area onto sensor array 220.

Sensor array 220 may include an array of sensors for registering, sensing, and measuring radiation (e.g., light) incident or falling onto sensor array 220. The radiation may be in the visible light wavelength range, the infrared wavelength range, or other wavelength ranges.

Sensor array 220 may include, for example, a charged coupled device (CCD) array and/or an active pixel array (e.g., a complementary metal-oxide-semiconductor (CMOS) sensor array). Sensor array 220 may also include a microbolometer (e.g., when camera 110 includes a thermal camera or detector).

Sensor array 220 outputs data that is indicative of (e.g., describes properties or characteristics) the radiation (e.g., light) incident on sensor array 220. For example, the data output from sensor array 220 may include information such as the intensity of light (e.g., luminance), color, etc., incident on one or more pixels in sensor array 220. The light incident on sensor array 220 may be an "image" in that the light may be focused as a result of lenses in optics chain 210. In some implementations, controller 240 may reduce the bit rate associated with a particular region of sensor array 220 by turning off, and/or reduce a sampling rate, of a particular sensor, or a set of sensors, of sensor array 220.

Sensor array 220 can be considered an "image sensor" because it senses images falling on sensor array 220. As the term is used herein, an "image" includes the data indicative of the radiation (e.g., describing the properties or characteristics of the light) incident on sensor array 220. Accordingly, the term "image" may also be used to mean "image sensor data" or any data or data set describing an image. Further, a "pixel" may mean any region or area of sensor array 220 for which measurement(s) of radiation are taken (e.g., measurements that are indicative of the light incident on sensor array 220). A pixel may correspond to one or more (or less than one) sensor(s) in sensor array 220. In alternative embodiments, sensor array 220 may be a linear array that may use scanning hardware (e.g., a rotating mirror) to form images, or a non-array sensor which may rely upon image processor 230 and/or controller 240 to produce image sensor data.

Bus 225 includes a communication path that enables components in camera 110 to communicate with each other. Controller 240 and/or image processor 230 perform signal processing operations on image data captured by sensor array 220. For example, image processor 230 may perform image processing on images captured by sensor array 220, such as noise reduction, filtering, scaling, etc. Controller 240 may control the operation of camera 110 and may provide instructions to other components of camera 110, such as sensor array 220, image processor 230, video encoder 250, communication interface 260, and/or motor controller(s) 270.

Controller 240 and/or image processor 230 may include any type of single-core or multi-core processor, microprocessor, latch-based processor, and/or processing logic (or families of processors, microprocessors, and/or processing logics) that interpret and execute instructions. Controller 240 and/or image processor 230 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Controller 240 may also determine and control the desired focus and position (e.g., tilt, pan, rotation, zoom, etc.) of camera 110. To do so, controller 240 sends commands to one or more motor controllers 270 to drive one or more motors 272 to tilt, pan, rotate, and/or zoom camera 110 or optically zoom lenses 212.

Memory 245 may include any type of volatile and/or non-volatile storage device that stores information and/or instructions. Memory 245 may include a random access memory (RAM) or any type of dynamic storage device, a read-only memory (ROM) device or any type of static storage device, a magnetic or optical recording memory device and its corresponding drive, or a removable memory device. Memory 245 may store information and instructions (e.g., applications and/or an operating system) and data (e.g., application data) for use by processor camera 110. Memory 245 may store information identifying one or more bit rate reduction factors and/or particular sensor array capture, image processing, and/or encoding processes and/or parameters to which the one or more bit rate reduction factors are to be applied.

Memory 245 may store instructions for execution by controller 240, image processor 230, video encoder 250, and/or communication interface 260. The software instructions may be read into memory 245 from another computer-readable medium or from another device. The software instructions may cause controller 240, image processor 230, video encoder 250, and/or communication interface 260 to perform processes described herein. For example, camera 110 may perform operations relating to the image processing (e.g., encoding, noise reduction, transcoding, detecting objects, etc.) in response to controller 240, image processor 230, and/or video encoder 250 executing software instructions stored in memory 245. Alternatively, hardwired circuitry (e.g., logic) may be used in place of, or in combination with, software instructions to implement processes described herein.

Video encoder 250 may compress video data based on one or more video codecs, such as an H.262/Moving Pictures Experts Group (MPEG)-2 codec, an H.263/MPEG-2 Part 2 codec, an H.264/MPEG-4 codec, an H.265/MPEG-H High Efficiency Video Coding (HVEC) codec, and/or another type of codec.

Communication interface 260 includes circuitry and logic circuitry that includes input and/or output ports, input and/or output systems, and/or other input and output components that facilitate the transmission of data to another device. For example, communication interface 340 may include a network interface card (e.g., Ethernet card) for wired communications or a wireless network interface (e.g., a Long Term Evolution (LTE), WiFi, Bluetooth, etc.) card for wireless communications.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 240 may perform functions described as performed by image processor 230 and vice versa. Alternatively or additionally, camera 110 may include a computing module as described below with respect to FIG. 3.

Figure 3:
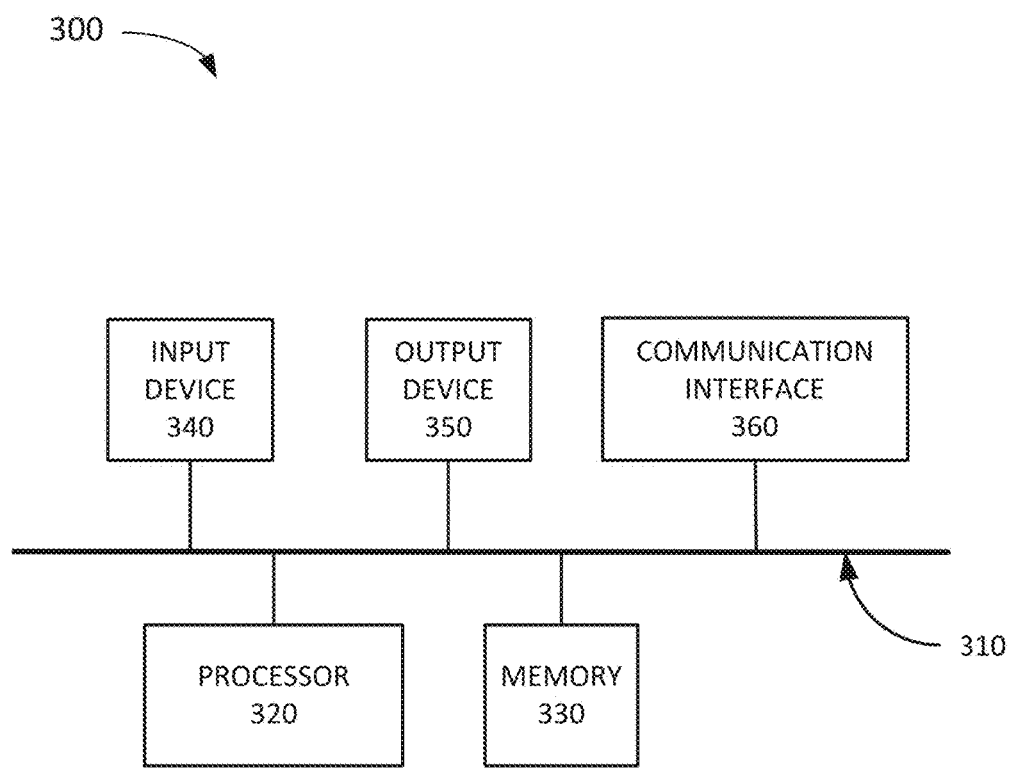
FIG. 3 is a block diagram illustrating exemplary components of a computing module according to an implementation described herein.

FIG. 3 is a block diagram illustrating exemplary components of a computing module 300 in an embodiment. Devices such as VMS 150, eye-tracking system 140, monitoring stations 125, and/or display devices 130 may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. Processor 320 may include an application-specific integrated circuit (ASIC), an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, a magnetic and/or optical recording memory device and its corresponding drive (e.g., a hard disk drive, optical drive, etc.), and/or a removable form of memory, such as a flash memory.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system may include software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination thereof. Communication interface 360 may include a transceiver that converts baseband signals to radio frequency (RF) signals or vice versa and may include an antenna assembly.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

In some implementations, computing module 300 may also include input device 340 and output device 350. Input device 340 may enable a user to input information into computing module 300. Input device 370 may include, for example, a keyboard, a mouse, a pen, a microphone, a remote control, an audio capture device, an image and/or video capture device, a touch-screen display, and/or another type of input device.

Output device 350 may output information to the user. Output device 350 may include a display, a printer, a speaker, and/or another type of output device. Input device 340 and output device 350 may enable a user interact with applications executed by computing module 300. In the case of a "headless" device (such as a deployed remote camera), input and output is primarily through communication interface 360 rather than input device 340 and output device 350.

As described in detail below, computing module 300 may perform certain operations relating to bit rate adjustments based on a historical gaze heat map. Computing module 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
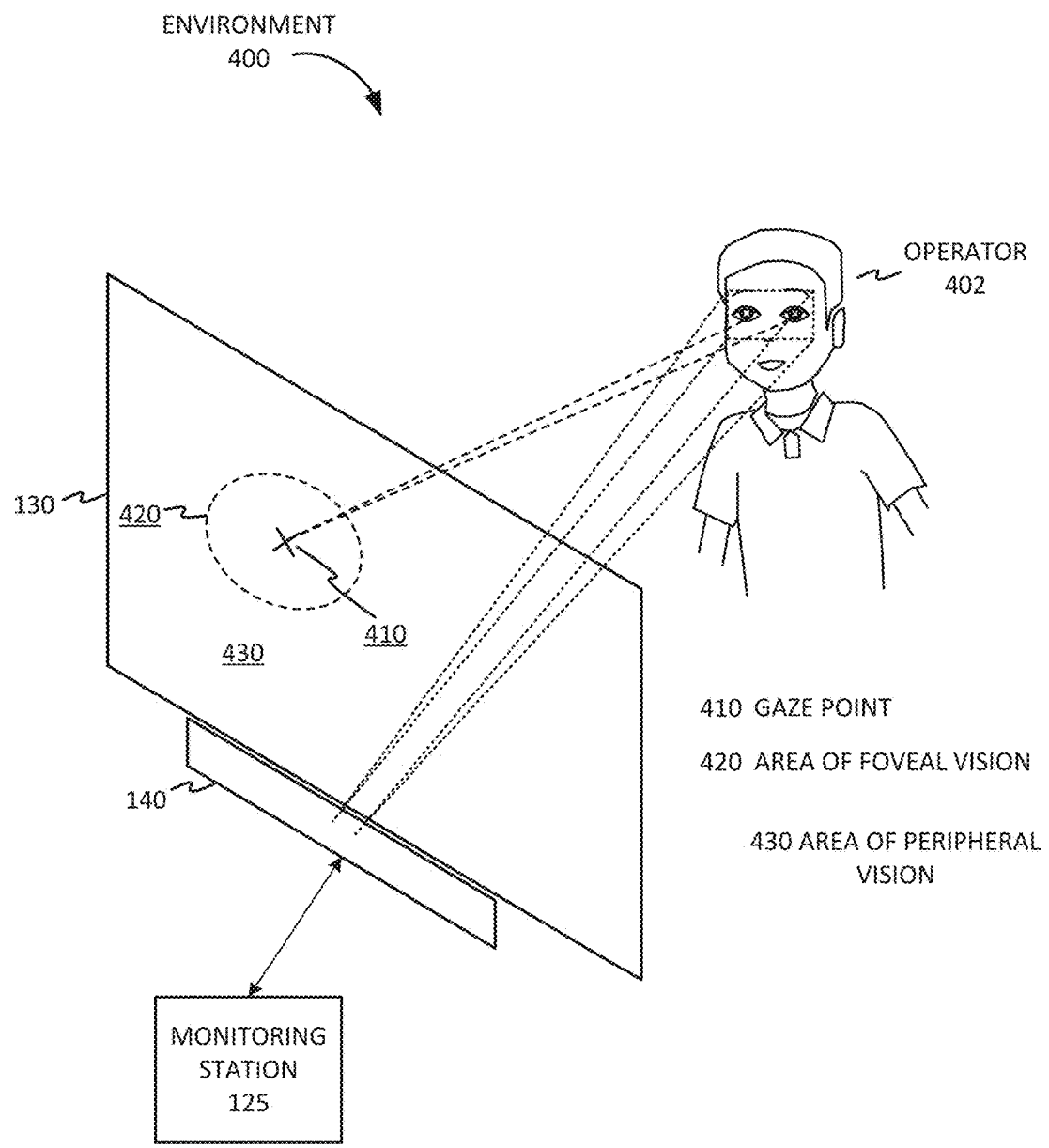
FIG. 4 illustrates an environment in which an operator views a display having an eye tracker according to an implementation described herein.

FIG. 4 illustrates an exemplary environment 400 of an operator 402 viewing display 130 having eye tracker 140 in an embodiment. Display 130 may include any type of display for showing information to operator 402. Operator 402 views display 130 and can interact with VMS 150 via an application running on monitoring station 125. For example, operator 402 may watch a video of area 106.

Eye tracker 140 includes a sensor (e.g., a camera) that enables monitoring station 125 to determine where the eyes of operator 402 are focused. In FIG. 4, for example, operator 402 sits in front of display 130 and the sensor in eye tracker 140 senses the eyes of operator 402. For example, eye tracker 140 may determine a gaze point 410, which may be represented as a location (e.g. pixel values associated with one or more pixels) on display 130. Based on the relative position of the operator and the display 130, a foveal vision area 420 (or "area 420") corresponding to the foveal vision of operator 402 may be estimated. Foveal vision corresponds to the detailed visual perception of the eye, and approximately subtends 1-2 spherical degrees. Accordingly, area 420 on display 130 may be calculated and understood to correspond to the part of operator's 402 vision with full visual acuity.

In an alternative embodiment, foveal vision area 420 may be determined experimentally during a setup procedure for a particular operator 402. Foveal vision area 420 is in contrast to peripheral vision area 430 outside of foveal vision area 420, which corresponds to the peripheral vision of operator 402. Gaze point 410 is approximately in the center of area 420 and corresponds to the line-of-sight from gaze point 410 to the eyes of operator 402. In an embodiment, information identifying gaze point 410 may be transmitted to VMS 150.

Figure 5A:
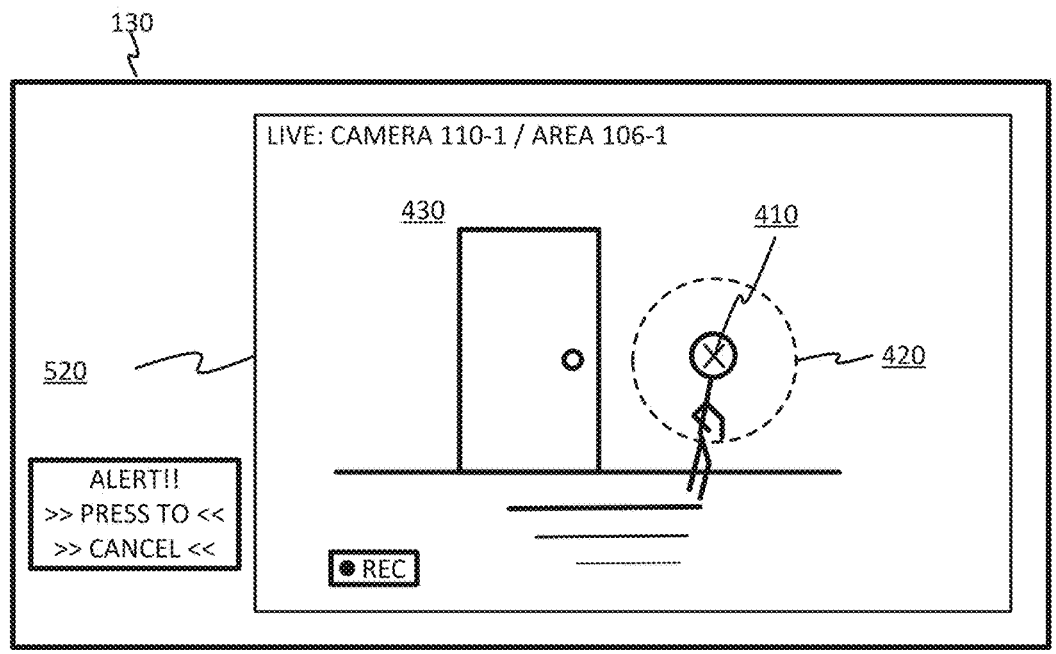
FIGS. 5A and 5B illustrate display from the perspective of an operator according to one or more implementations described herein.

FIG. 5A illustrates display 130 from the perspective of operator 402. As shown in FIG. 5A, display 130 includes gaze point 410, foveal vision area 420, and peripheral vision area 430. Display 130 also includes a video frame 520 in which a video stream is presented to operator 402. In this example, frame 520 shows a video stream from camera 110 of area 106, which happens to include a door and an individual who appears to be moving. Operator's 402 foveal vision area 420 encompasses the individual and gaze point 410 is directly on the individual's face. The door displayed in frame 520, on the other hand, appears in operator's 402 peripheral vision area 430.

In some implementations, the gaze heat map may be generated based on gaze point 410. In other implementations, the gaze heat map may be generated based on foveal vision area 420. In yet other implementations, the gaze heat map may be generated based on an area in size somewhere between the size of gaze point 410 and the size of foveal vision area 420. In yet other implementations, the gaze heat map may be generated based on an area that is larger, and centered upon, foveal vision area 420.

Figure 5B:
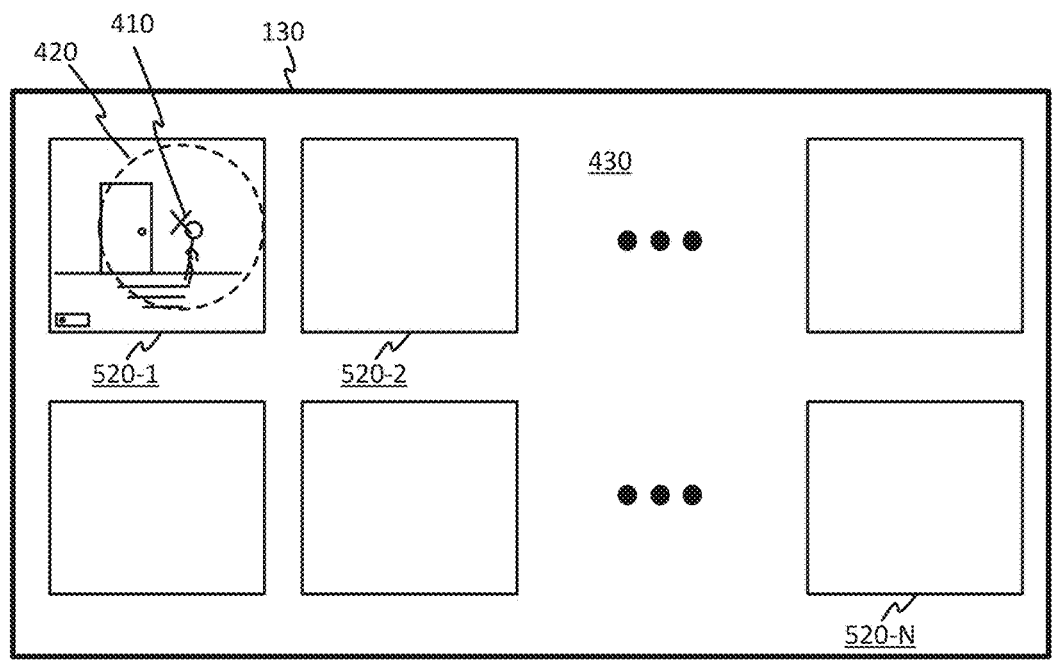

FIG. 5B also illustrates display 130 from the perspective of operator 402. In contrast to FIG. 5A, however, display 130 in FIG. 5B shows numerous frames 520-1 through 520-N (individually "frame 520"; or plural "frame 520"). Each frame 520-1 through 520-N may present a different video stream so operator 402 can monitor more than one area. The different streams may be produced by different cameras 110-1 through 110-M. In other embodiments, each frame 520-1 through 520-N may be displayed on a different display 130 arranged in front of the operator (e.g., on a wall, in an arc in front of the operator, etc.). Alternatively or additionally, each frame 520-1 through 520-N may display different streams generated by a common camera 110-x. For example, camera 110-x may use a "fisheye" lens and capture video from an extended angular area. The video may be processed to reduce distortions introduced by the fisheye lens, and separate the extended angular area into separate video streams corresponding to different areas, which may be separately presented in frames 520-1 through 520-N. As with FIG. 5A, display 130 in FIG. 5B includes gaze point 410, foveal vision area 420, and peripheral vision area 430.

In this example, frame 520-1 may show a video stream from camera 110-1 of area 106-1; video frame 520-2 may show a video stream from camera 110-2 of area 106-2; etc. Operator's 402 foveal vision area 420 in FIG. 5B encompasses the majority of frame 520-1 and gaze point 410 is close to the individual's face. The door displayed in frame 520 is also in foveal vision area 420. The other frames 520-2 through 520-N, on the other hand, are in operator's 402 peripheral vision area 430. The location of gaze point 410 and/or foveal vision area 420 may be used to select and/or designate a particular frame 520-x for subsequent processing which may be different from other frames 520. For example, as shown in FIG. 5B, gaze point 410 may be used to indicate that frame 520-1 is a frame of interest to the operator. Accordingly, the video monitoring system may allocate more resources to frame 520-1 (e.g., bandwidth and/or processing resources) to improve the presentation of the video stream in frame 520-1, and reduce resources allocated to other streams corresponding to frames which are not the focus (e.g., in the peripheral vision) of the operator.

Figure 6:
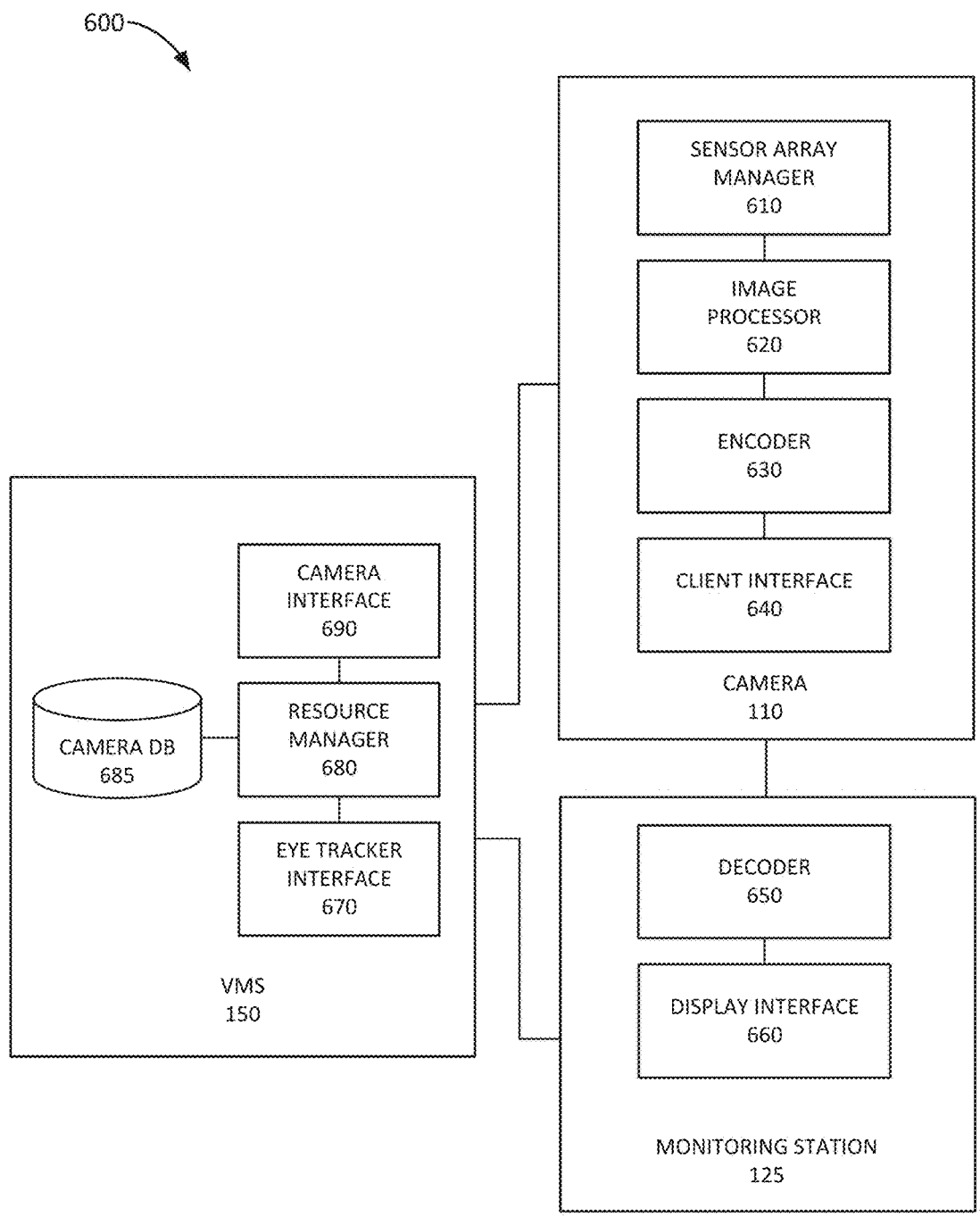
FIG. 6 is a diagram of functional components of some of the components of FIG. 1.

FIG. 6 is a diagram of functional components of camera 110, display 130, and VMS 150. The functional components of camera 110 may be implemented, for example, via controller 240 executing instructions stored in memory 245. Alternatively, some or all of the functional components included in camera 110 may be implemented via hard-wired circuitry. The functional components of display 130 and/or VMS 150 may be implemented, for example, via processor 320 executing instructions stored in memory 330. Alternatively, some or all of the functional components included in display 130 and/or VMS 150 may be implemented via hard-wired circuitry.

As shown in FIG. 6, camera 110 may include a sensor array manager 610, an image processor 620, an encoder 630, and a client interface 640; monitoring station 125 may include a decoder 650 and a display interface 660; and VMS 150 may include an eye tracker interface 670, a resource manager 680, a camera database (DB) 685, and a camera interface 690.

A video stream from camera 110 may follow the following processing path to display 130. Sensor array manager 610 directs sensor array 220 to capture a set of images for the video stream. Image processor 620 may perform image processing on the captured images, such as noise reduction operations and/or scaling operations. Encoder 630 may then compress the images using a codec such as, for example, MPEG-4. Client interface 640 may then encapsulate the encoded images into a container, such as, for example, MPEG-4 Part 14 (MP4) and may transmit the contained encoded images via data units across network 120 to monitoring station 125 for display on display 130. Decoder 650 may retrieve the encoded images from the container, may decode the images, and may provide the decoded images to display interface 660. Display interface 660 may store the decoded images in a buffer and may stream the decoded images from the buffer as a video stream on display 130.

Resource manager 680 may manage resources associated with environment 100. For example, resource manager 680 may manage network resources associated with transmission of data from cameras 110 to monitoring stations 125 and associated displays 130 across network 120, and/or processor and memory resources associated with cameras 110, monitoring stations 125, and/or displays 130. Resource manager 680 may instruct camera 110 to reduce a bit rate associated with a video stream from camera 110 to display 130 for a low interest area determined based on a historical gaze heat map. Eye tracker interface 670 may be configured to communicate with eye tracker 140. For example, eye tracker interface 670 may obtain information identifying a gaze area associated with a particular video stream from eye tracker 140 using a particular Application Programming Interface (API) associated with eye tracker 140.

Resource manager 680 may collect gaze information from eye trackers 140 via eye tracker interface 670 and may, over a time period, generate a historical gaze heat map based on the collected gaze information. Resource manager 580 may store the generated historical gaze heat map in camera DB 685. Resource manager 580 may determine one or more low interest areas, and/or one or more high interest areas, for camera 110 based on the generated historical gaze heat map. Resource manager 580 may then instruct camera to reduce a bit rate for the one or more low interest areas, and/or to increase a bit rate for one or more high interest areas.

Camera DB 685 may store information relating to particular cameras 110. Exemplary information that may be stored in camera DB 685 is described below with reference to FIG. 7A. Camera interface 690 may be configured to communicate with cameras 110 and may send instructions from resource manager 680 via a particular API associated with camera 110.

Sensor array manager 610 may store, manage, and/or apply one or more sensor array parameters. For example, sensor array manager 610 may store parameters governing whether a particular sensor in sensor array 220 should be turned on or off, a sampling rate for a particular sensor, a sensitivity factor for a particular sensor, and/or another type of sensor parameters. Moreover, sensor array manager 610 may store one or more setting for sensor array 220 to determine a type of image captured by sensor array 220. For example, a first setting may correspond to a regular image, a second setting may correspond to a wide angle or panoramic image, a third setting may correspond to a low light setting, etc. Sensor array manager 610 may receive an instruction from VMS 150 to adjust one or more of the stored parameters in order to adjust a bit rate in a low interest area of sensor array 220 based on a gaze heat map determined by VMS 150.

Image processor 620 may store, manage, and/or apply one or more image processing parameters. For example, image processor 620 may store parameters relating to a noise reduction process, such as a low pass filter, parameters relating to a scaling process, and/or other types of image processing parameters that may be used to change a bit rate associated with a region of a video stream. Image processor 620 may receive an instruction from VMS 150 to adjust one or more of the stored parameters in order to adjust a bit rate in a low interest area of a video stream based on a gaze heat map determined by VMS 150.

Encoder 630 may store, manage, and/or apply one or more encoding parameters, including intra-frame encoding parameters and inter-frame encoding parameters. For example, encoder 630 may store a quantization parameter (QP) for particular regions and/or objects of a video stream, store a set of coefficients for a discrete cosine transform (DCT), a Mean Absolute Difference (MAD) of Prediction Error parameter, and/or other encoding parameters. Encoder 630 may receive an instruction from VMS 150 to adjust one or more of the stored encoding parameters in order to adjust a bit rate in a low interest area of a video stream based on a gaze heat map determined by VMS 150.

Client interface 640 may store, manage, and/or apply one or more image transmission parameters. For example, client interface 640 may store a Quality of Service (QoS) parameter. Client interface 640 may receive an instruction from VMS 150 to adjust one or more of the stored encoding parameters in order to adjust a bit rate in a low interest area of a video stream based on a gaze heat map determined by VMS 150.

Although FIG. 6 shows exemplary functional components of camera 110, display 130, and VMS 150, in other implementations, camera 110, display 130, or VMS 150 may include fewer functional components, different functional components, differently arranged functional components, or additional functional components than depicted in FIG. 6. Additionally, any one of the components (or any group of components) of camera 110, display 130, and VMS 150 may perform functions described as performed by one or more other functional components of camera 110, display 130, and VMS 150.

Figure 7A:
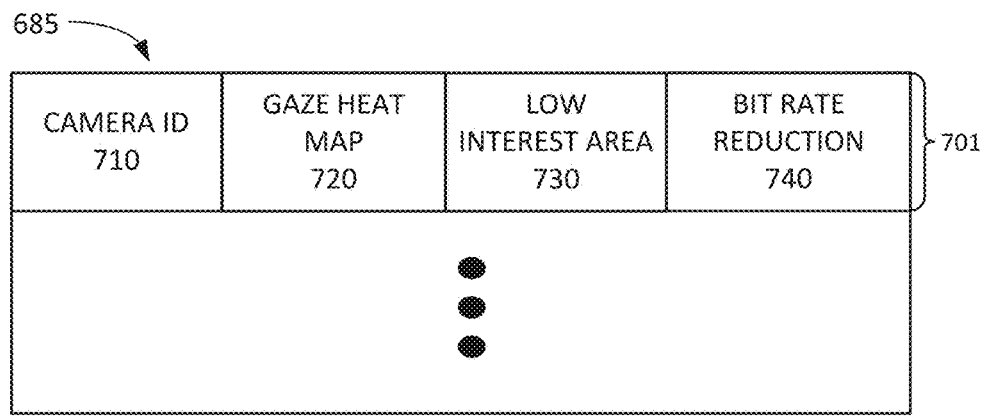
FIGS. 7A-7B are diagrams of exemplary components of the camera database of FIG. 6.

FIG. 7A is a diagram of exemplary components of the camera database of FIG. 6. As shown in FIG. 7A, camera DB 685 may store one or more camera records 701. Each camera record 701 may store information relating to a particular camera 110. Camera record 701 may include a camera identifier (ID) field 710, a gaze heat map 720, a low interest area field 730, and a bit rate reduction field 740.

Camera ID field 710 may store one or more IDs associated with a particular camera 110. For example, camera ID may store a Media Access Control (MAC) address for the particular camera 110, an Internet Protocol (IP) address for the particular camera 110, a name assigned to the particular camera 110 by VMS 150, and/or another type of ID. Furthermore, camera ID field 710 may store make and model information for the particular camera 110 and/or a software version installed on the particular camera 110. Moreover, camera ID field 710 may include authentication information for the particular camera 110 that enables VMS 150 to establish a secure connection with the particular camera 110.

Gaze heat map 720 may store gaze heat map information for the particular camera 110. For example, each location (e.g., pixel, set of pixels, etc.) of video stream may be associated with a set of data points indicating gaze information. Exemplary information that may be stored in gaze heat map 720 is described below with reference to FIG. 7B.

Low interest area field 730 may store information identifying one or more low interest areas for the particular camera 110. Furthermore, one or more high interest areas may be identified in low interest area field 730 as well. Additionally, low interest area field 730 may identify one or more low interest areas for a particular time of day, a particular day of week, a particular pan, tilt, zoom, rotation, and/or image type setting for the particular camera 110, a particular event type, a particular operator, and/or other types of parameters. Each low interest area may be identified as a set of pixels in the video stream from the particular camera 110.

Bit rate reduction field 740 may identify one or more bit rate reduction factors that are to be applied in particular situations. Furthermore, bit rate reduction field 740 may identify one or more bit rate reduction factors that are currently being applied to a video stream associated with the particular camera 110. For example, bit rate reduction field 740 may identify one or more sensor array manager 610 parameters, one or more image processor parameters 620, one or more encoder parameters, and/or one or more client interface parameters 640. The encoder parameters may include different standard encoding profiles which can be adjusted to effect bitrate. For example, when using the H.264 video encoding standard, encoding profiles which may be selected include Baseline, Extended, Main, High, High 10, High 4:2:2, and High 4:4:4 Predictive. Additionally or alternatively, lower level encoding parameters may be adjust to further adjust bitrate. For example, for MPEG encoding standards, the quantization scaling matrices may be selected to increase quantization to reduce the bit rates for encoded intra-frames. Moreover, change threshold levels may be adjusted to change compression rates for encoded inter-frames. For example, the threshold for movement may be raised when encoding P-frames and/or B-frames, and thus less changes are encoded which would lower the bitrate for an encoded video stream.

Although FIG. 7A shows exemplary components of camera DB 685, in other implementations, camera DB 685 may store fewer components, different components, differently arranged components, or additional components than depicted in FIG. 7A.

Figure 7B:
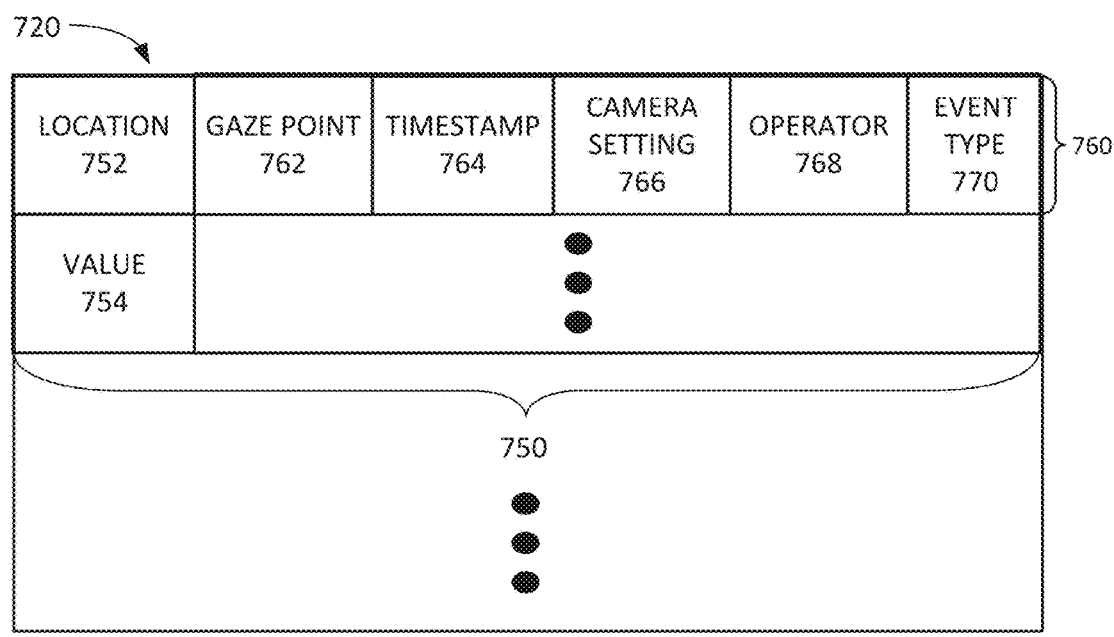

FIG. 7B illustrates exemplary components of gaze heat map 720. As shown in FIG. 7B, gaze heat map 720 may include a set of location records 750. Each location record 750 may store gaze information and additional information for a particular location in the video stream of camera 110 associated with camera record 701. Location record 750 may include a location field 752, a value field 754, and one or more gaze information records 760.

Location field 752 may identify a particular location. For example, location field 752 may identify a pixel, a subpixel, a set of pixels, an area, and/or another subunit of a video frame from camera 110. Value field 754 may store one or more gaze heat map values associated with the particular location. For example, value field 754 may store a normalized value of the number of times gaze point 410, or another measure of gaze information (e.g., foveal vision area 420, an area with a designated radius around gaze point 410, etc.) fell within the particular location with a particular time period. If the particular time period is ongoing, value field 754 may continue to be updated as new gaze information is received from eye tracker 140.

Furthermore, value field 754 may store additional values. For example, value field 754 may store values corresponding to a subset of gaze information records 760 filtered based on a parameters, such as a time of day, a camera setting, etc. Moreover, value field 754 may store one or more threshold for determining a low interest area, and/or one or more threshold for determining a high interest area. For example, different thresholds may be set based on a desired reduction in bandwidth and/or processor load for the video stream from camera 110. If a higher reduction in bandwidth and/or processor load is selected, a higher threshold may be selected, which may result in more locations being filtered out of gaze heat map 720, resulting in a higher low interest area.

Each gaze information record 760 may store information relating to a particular gaze information data point associated with the particular location. Gaze information record 760 may include a gaze point field 762, a timestamp field 764, a camera setting field 766, an operator field 768, and an event type field 770.

Gaze point field 762 may identify a particular gaze point data point. For example, gaze point field 762 may store gaze information data received from eye tracker 140. Timestamp field 764 may include a timestamp (e.g., time and date) for the particular gaze point data point. Camera setting field 766 may identify one or more camera settings associated with the particular gaze point data point. The camera settings information may be received from a computer device associated with display 130 and/or from camera 110 via camera interface 690. The camera settings information may include information identifying a pan setting, a tilt setting, a rotation setting, and/or a zoom setting. Furthermore, the camera settings information may identify a particular image type setting, such as a normal angle setting, a wide angle setting, a fisheye lens setting, a color filter setting, a light source setting, a sensor array setting (e.g., visible light, infrared light, etc.), and/or another type of image type setting.

Operator field 768 may identify a particular operator associated with the gaze point data point. For example, different operators may prefer to look at different parts of the video frame. The operator may be identified, for example, based on the login information obtained from the computer device associated with display 130. Event type field 770 may identify an event type associated with the particular gaze point data point. For example, VMS 150 may obtain data that a particular sensor has been activated in connection with camera 110 at the time the particular gaze point data point was obtained, such a motion sensor, a door sensor, a fire alarm sensor, a microphone, a people counter sensor, a vehicle sensor in a garage, and/or another type of sensor. Furthermore, VMS 150 may be configured to receive calendar information associated with monitored area 106, such as events scheduled for the particular area (e.g., a conference room being booked for a meeting, maintenance being scheduled, a fire alarm being scheduled, etc.).

Although FIG. 7B shows exemplary components of gaze heat map 720, in other implementations, gaze heat map 720 may store fewer components, different components, differently arranged components, or additional components than depicted in FIG. 7B.

Figure 8:
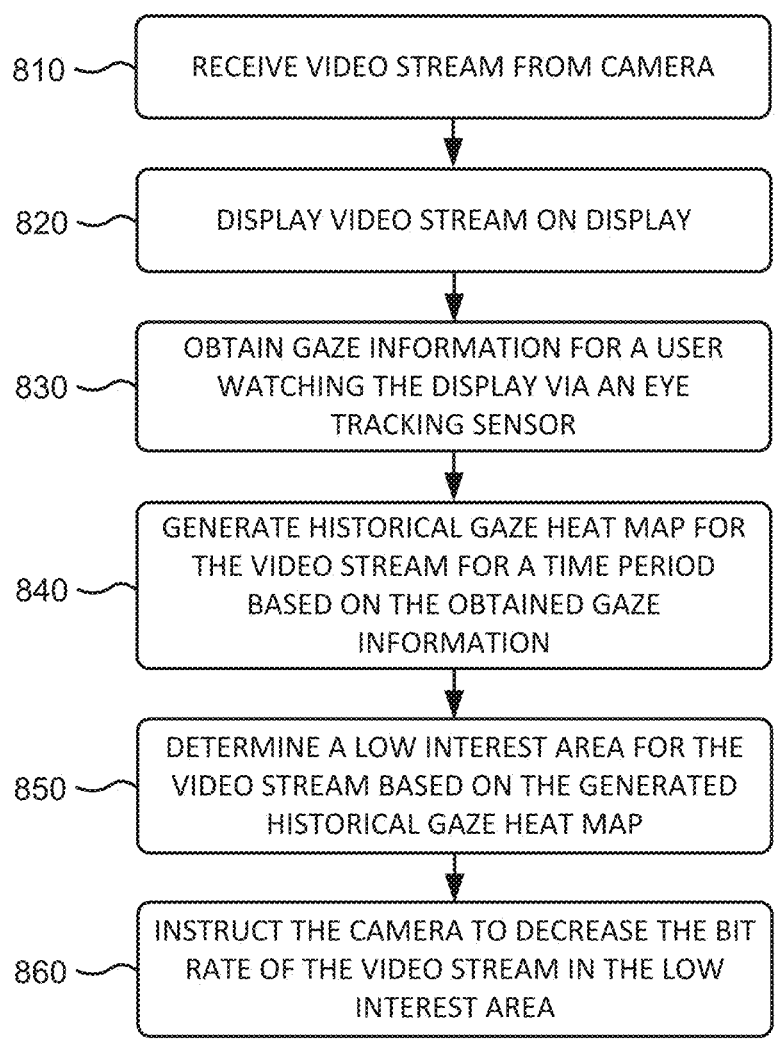
FIG. 8 is a flowchart of a process for controlling a bit rate based on a gaze area according to an implementation described herein.

FIG. 8 is a flowchart of a process for controlling a bit rate based on a gaze area according to an implementation described herein. In one implementation, the process of FIG. 8 may be performed by VMS 150. In other implementations, some or all of the process of FIG. 8 may be performed by another device or a group of devices separate from and/or including VMS 150, such as camera 110 and/or monitoring station 125.

The process of FIG. 8 may include receiving a video stream from a camera (block 810) and displaying the video stream on a display (block 820). For example, an operator may log into a computer device associated with monitoring station 125 and/or display 130 and may log into VMS 150 to configure one or more cameras 110. VMS 150 may configure camera 110 to provide a video stream of monitored area 106 to display 130 and display 130 may continue to receive video stream data from camera 110 and display the video stream data.

Gaze information may be obtained for an operator watching the display via an eye tracking sensor (block 830). For example, eye tracker 140 may monitor the operator's eyes to determine gaze point 410 and/or foveal vision area 420 and determine the gaze area based on the determined gaze point 410 and/or foveal vision area 420. Information identifying the determined gaze area may be provided to resource manager 680 of VMS 150. Alternatively, raw data from eye tracker 140 may be provided to VMS 150 and VMS 150 may determine the gaze area based on the raw data.

A historical gaze heat map for the video stream may be generated based on the obtained gaze information (block 840). For example, VMS 150 may add up the gaze information for each location of the video stream and may generate a value for each location indicating how many times, or how frequently, the operator's gaze point 410 (and/or foveal vision area 420) fell on the location. VMS 150 may use the generated values to identify low interest (and/or high interest) areas for the video stream.

In some implementations, VMS 150 may generate a graphical representation of the gaze heat map that may be available for viewing by the operator, or by an administrator. VMS 150 may assign a shading or a color to each value in the gaze heat map in the graphical representation. For example, a dark shading or color may be assigned to a high value corresponding to a location that is frequently associated with the operator's gaze point 410 and a light shading or color may be assigned to a low value corresponding to a location that is associated with the operator's gaze point 410 less frequently.

A low interest area for the video stream may be determined based on the generated historical gaze heat map (block 850). For example, VMS 150 may analyze the historical gaze heat map to identify areas that have low historical gaze occurrences. A low interest area threshold may be set for a particular location in the video stream, such as a pixel or a set of pixels, to determine whether the location satisfies the requirements for a low interest area. As an example, if an operator looks at the location less than a threshold number of times per unit time (e.g., per hour), the location may be designated as a low interest area. As another example, if the operator looks at the location less than a threshold percentage of time out of the total amount of time watching the video stream, the location may be designated as a low interest area. A similar procedure may be used to identify a high interest area. For example, if an operator looks at the location more than a threshold number of times per unit time (e.g., per hour), and/or if the operator looks at the location more than a threshold percentage of time out of the total amount of time watching the video stream, the location may be designated as a high interest area.

As mentioned above with respect to gaze heat map field 720 of camera DB 685, each location in the gaze heat map may include additional information, such as time and date information, camera setting information, operator information, and/or event type information for each gaze information data point. The additional information may be used to refine the gaze heat map with respect to any parameter included in the gaze heat map. A refined gaze heat map may be used to generate low interest (and/or high interest) areas with respect to particular parameters.

Thus, different low interest area (and/or high interest areas) may be selected for different filtering criteria for the historical gaze heat map. For example, different low interest areas may be selected for different times of day, different days of the week, different camera settings, different operators, and/or different event types.

Furthermore, in some implementations, a graphical representation of a refined gaze heat map may be generated and may available for viewing by the operator or by an administrator. Thus, for example, a graphical representation of the gaze heat map for a particular time of day may be generated.

The camera may be instructed to decrease the bit rate of the video stream in the low interest area (block 860). For example, VMS 150 may select one or more bit rate reduction factors from bit rate reduction field 740 for the particular camera 110, such as a sensor array bit rate reduction factor, an image processing bit rate reduction factor, an encoding bit rate reduction factor, and/or an image transmission bit rate reduction factor. As an example, VMS 150 may select to adjust a sampling rate of a subset of sensors in sensor array 220 associated with the low interest area, to down-sample (e.g. lower the resolution) the low interest area, to increase a noise reduction process in the low interest area, to increase an encoding compression parameter in the low interest area, and/or to adjust another parameter that may result in a reduced bit rate in the low interest area.

Figure 9A:
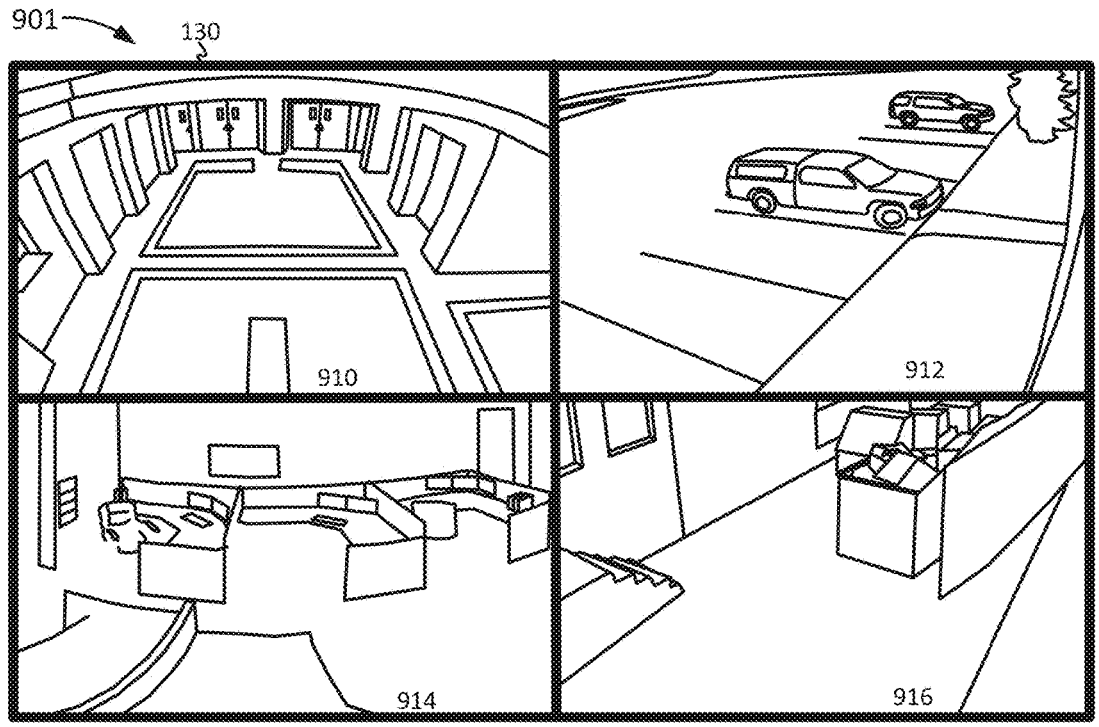
FIGS. 9A-9D are diagrams of exemplary gaze heat map scenarios according to one or more implementations described herein.

FIGS. 9A-9D are diagrams of exemplary gaze heat map scenarios according to one or more implementations described herein. As shown in FIG. 9A, video frame set 901 on display 130 may include video streams from four different cameras 110. Frame 910 displays a video stream from a camera monitoring an entrance lobby of an office building. The lobby includes entrance doors, a vestibule, and a hallway. Frame 920 displays a video stream from a camera monitoring a parking lot with a pathway to a door. Frame 930 displays a video stream from a camera monitoring an office suite with cubicles. Frame 940 displays a video stream from a camera monitoring a back door that opens into an alley.

Figure 9B:
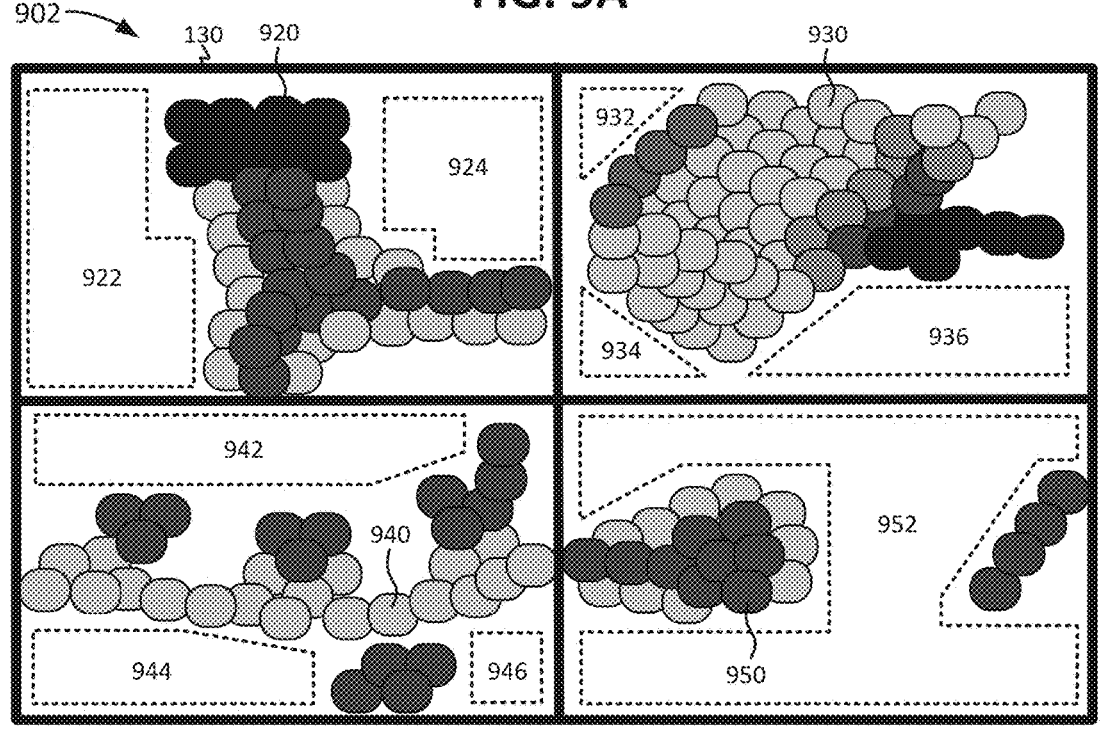

FIG. 9B illustrates a set of gaze heat maps 902 generated for video frame set 901. Set of gaze heat maps 902 may correspond to a graphical representation of information stored in gaze heat map 720. If a value at a particular location 752 of gaze heat map 720 is below a threshold, the location may be designated as not being included in the gaze meat map 720 in a graphical representation or for purposes of determining a low interest area. A graphical representation of gaze heat map 720 may be generated and displayed to an operator or administrator based on request. Additionally, identified low interest areas may be displayed along with the gaze heat map. In some implementations, a user or an operator may select one or more low interest areas manually, or may adjust identified low interest areas manually, via a graphical user interface that displays the graphical representation of gaze heat map 720.

Gaze heat map 920 corresponds to frame 910. Gaze heat map 920 indicates that the operator spends most of the time watching the main doors and the path that people walk from the main doors down the vestibule and the side hallway. Frame 910 includes a low interest area 922 and a low interest area 924, which correspond to areas of frame 910 that the operator spends a relatively low amount of time watching, because few people walk or stand in those areas.

Gaze heat map 930 corresponds to frame 912. Gaze heat map 930 indicates that the operator spends most of the time watching the walkway to the building entrance and the parking lot. Frame 912 includes a low interest area 932, a low interest area 934, and a low interest area 936, which correspond to areas of frame 912 that the operator spends a relatively low amount of time watching, such as the grass next to the walkway.

Gaze heat map 940 corresponds to frame 914. Gaze heat map 940 indicates that the operator spends most of the time watching the cubicles and the path between the cubicles. Frame 914 includes a low interest area 942, a low interest area 944, and a low interest area 946, which corresponds to areas of frame 914 that the operator does not watch very often, such as the wall above the cubicles or the wall that separates the cubicles in the foreground.

Gaze heat map 950 corresponds to frame 916. Gaze heat map 950 indicates that the operator spends most of the time watching the stairway and nearby area, where people step out to smoke cigarettes, and an alley leading to the back area, where nearby foot traffic sometimes passes. Frame 916 includes low interest area 952, which the operator spends a relatively low amount of time watching, as that area does not see much foot traffic.

Figure 9C:
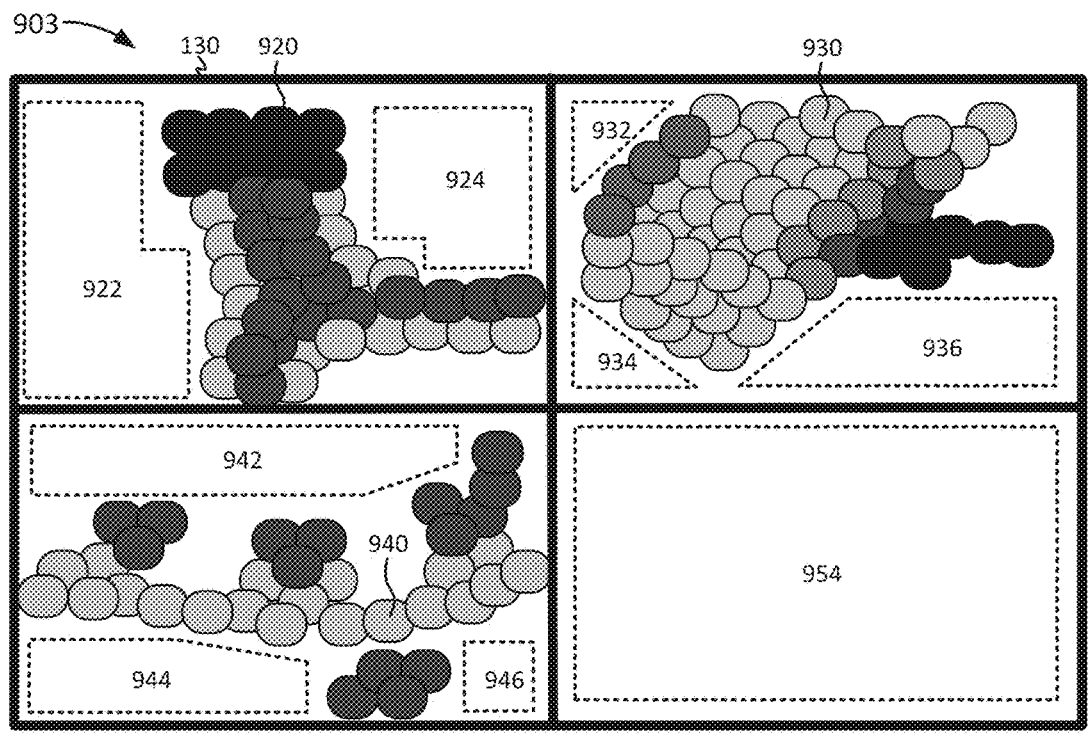
Figure 9D:
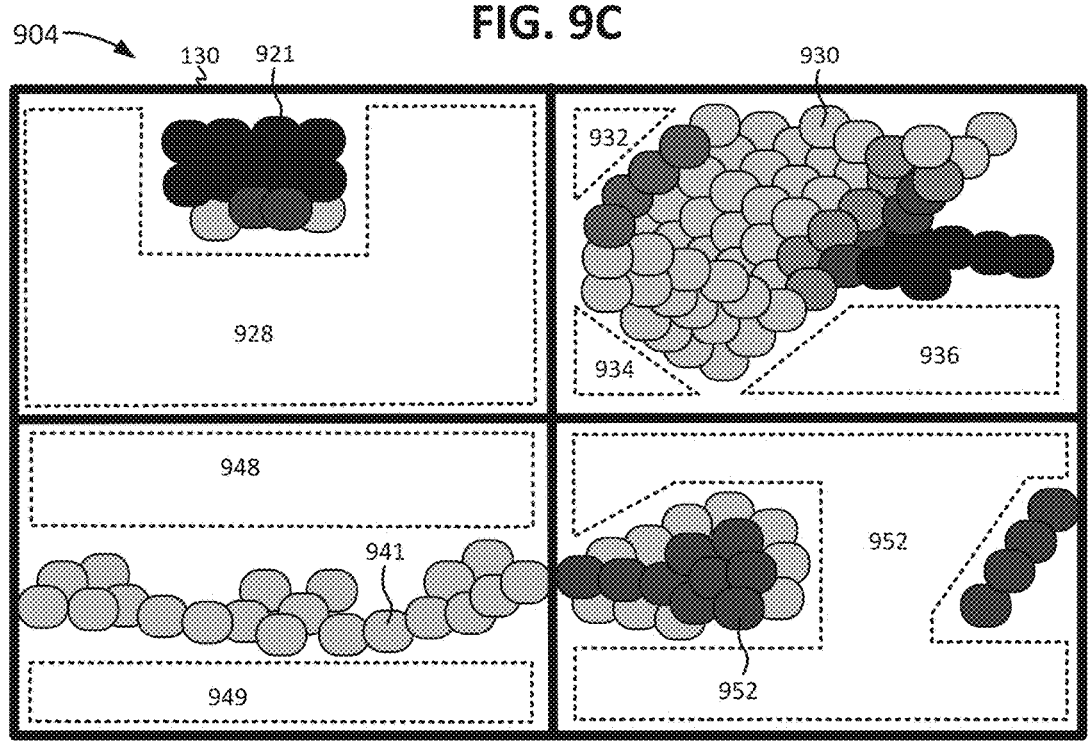

FIGS. 9C and 9D illustrate a set of gaze heat maps 903 and 904 for different times of day. As shown in FIG. 9C, gaze heat map 903 may correspond to a morning rush hour time period when employees are entering the building associated with cameras 110 providing video streams for frames 910, 912, 914, and 916. Frame 916 for the video stream from the camera monitoring a back door that opens into an alley may receive no attention from the operator during the morning hours, as no people may be frequenting this area during this time. Thus, the whole of frame 916 may be designated as a low interest area 954 and the bit rate for the entire video stream for frame 916 may be reduced during these times.

As shown in FIG. 9D, gaze heat map 904 may correspond to a night time period when employees have left the building associated with cameras 110 providing video streams for frames 910, 912, 914, and 916. Frames 910 and 914 may receive less attention from the operator during this time. For example, the operator may continue to monitor the front doors to the lobby, but may not monitor the vestibule of the lobby as no people move about during the night. Thus, low interest areas 922 and 924 may be expanded into low interest area 928 during the night hours. Similarly, the operator may spend less time observing the cubicles in frame 914 and low interest areas 942, 944, and 946 may be changed to low interest areas 948 and 949 during the night hours.

This application incorporates by reference herein the following patent applications filed the same day as this patent application: U.S. patent application Ser. No. 15/395,856, titled "Gaze Controlled Bit Rate," and filed Dec. 30, 2016; U.S. patent application Ser. No. 15/395,403, titled "Alarm Masking Based on Gaze in Video Management System," filed Dec. 30, 2016; and U.S. patent application Ser. No. 15/395,790, titled "Block Level Frame Rate Control Based on Gaze," filed Dec. 30, 2016.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 8, the order of the blocks may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The word "exemplary" as used herein means "as an example for illustration."

The terms "comprises" and "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving a video stream from a camera;
   displaying the video stream on a display;
   obtaining, via an eye tracking sensor, gaze information for an operator watching the display;
   generating a historical gaze heat map for the video stream for a time period based on the obtained gaze information, wherein generating the historical gaze heat map includes generating a value for a particular location in the video stream indicating how frequently an operator's gaze point fell on the particular location during the time period, wherein the time period is longer than a day;
   determining a first low interest area for a first time of day or day of week based on a historical gaze heat map generated for the first time of day or day of week over multiple instances of the first time of day or day of week;
   determining a second low interest area for a second time of day or day of week, wherein the second low interest area is different from the first low interest area based on a historical gaze heat map generated for the second time of day or day of week over multiple instances of the second time of day or day of week;
   and
   instructing the camera to decrease a bit rate of the video stream in at least one of the first low interest area or the second low interest area.

2. The method of claim 1, further comprising:
   determining a high interest area of the video stream based on the generated historical gaze heat map; and
   instructing the camera to increase a bit rate of the video stream in the high interest area.

3. The method of claim 1, wherein determining a first low interest area of the video stream based on the generated historical gaze heat map includes:
   identifying a pan, zoom, tilt, rotation, or image type setting for the camera;
   selecting a subset of the generated historical gaze heat map associated with the identified pan, zoom, tilt, rotation, or image type setting for the camera; and
   determining a third low interest area of the video stream based on the selected subset of the generated historical gaze heat map.

4. The method of claim 1, wherein the video stream includes a plurality of video streams and wherein the display includes a plurality of displays.

5. The method of claim 1, further comprising:
   associating an event type with a particular change in the historical gaze heat map;
   detecting an event of the associated event type; and
   changing the first low interest area based on the particular change in the historical gaze heat map, in response to detecting the event.

6. The method of claim 1, wherein instructing the camera to decrease the bit rate of the video stream in the low interest area includes:
   instructing the camera to reduce a sampling rate for a sensor associated with the at least one of the first low interest area or the second low interest area.

7. The method of claim 1, wherein instructing the camera to decrease the bit rate of the video stream in the low interest area includes:
   instructing the camera to increase a noise reduction process for the at least one of the first low interest area or the second low interest area prior to encoding the video stream.

8. The method of claim 1, wherein instructing the camera to decrease the bit rate of the video stream in the low interest area includes:
   instructing the camera to adjust an encoding parameter for an encoding processing unit associated with the at least one of the first low interest area or the second low interest area.

9. The method of claim 3, further comprising:
   associating an event type with a particular change in the historical gaze heat map;
   detecting an event of the associated event type; and
   changing the first low interest area based on the particular change in the historical gaze heat map, in response to detecting the event.

10. A computer system comprising:
    a memory to store instructions; and
    a receiver to receive a video stream from a camera;
    a display to display the video stream;
    a processor configured to execute the instructions to:
      obtain, via an eye tracking sensor, gaze information for an operator watching the display,
      generate a historical gaze heat map for the video stream for a time period based on the obtained gaze information, wherein generating the historical gaze heat map includes generating a value for a particular location in the video stream indicating how frequently an operator's gaze point fell on the particular location during the time period, wherein the time period is longer than a day,
      determine a first low interest area for a first time of day or day of week based on a historical gaze heat map generated for the first time of day or day of week over multiple instances of the first time of day or day of week,
      determine a second low interest area for a second time of day or day of week, wherein the second low interest area is different from the first low interest area based on a historical gaze heat map generated for the second time of day or day of week over multiple instances of the second time of day or day of week,
      and
      determine to instruct the camera to decrease a bit rate of the video stream in at least one of the first low interest area or the second low interest area; and
    a transmitter to send an instruction to the camera to decrease the bit rate of the video stream in the low interest area.

11. The computer system of claim 10,
    wherein the processor is further configured to determine a high interest area of the video stream based on the generated historical gaze heat map;
    wherein the processor is configured to determine to instruct the camera to increase a bit rate of the video stream in the high interest area; and
    wherein transmitter is configured to send an instruction to the camera to increase the bit rate of the video stream in the high interest area.

12. The computer system of claim 10, wherein the processor is further configured to:
    identify a pan, zoom, tilt, rotation, or image type setting for the camera;

select a subset of the generated historical gaze heat map associated with the identified pan, zoom, tilt, rotation, or image type setting for the camera; and determine a third low interest area of the video stream based on the selected subset of the generated historical gaze heat map.

13. The computer system of claim 10, wherein the video stream includes a plurality of video streams and wherein the display includes a plurality of displays.

14. The computer system of claim 10, wherein the processor is further configured to:

associate an event type with a particular change in the historical gaze heat map;

detect an event of the associated event type; and change the first low interest area based on the particular change in the historical gaze heat map, in response to detecting the event.

15. The computer system of claim 10, wherein the processor is configured to determine to instruct the camera to reduce a sampling rate for a sensor associated with the low interest area; and wherein the instruction to decrease the bit rate of the video stream in the at least one of the first low interest area or the second low interest area includes an instruction to the camera to reduce the sampling rate for the sensor associated with the at least one of the first low interest area or the second low interest area.

16. The computer system of claim 10, wherein the processor is further configured to determine to instruct the camera to increase a noise reduction process for the at least one of the first low interest area or the second low interest area prior to encoding the video stream; and wherein the instruction to decrease the bit rate of the video stream in the at least one of the first low interest area or the second low interest area includes an instruction to increase the noise reduction process for the at least one of the first low interest area or the second low interest area prior to encoding the video stream.

17. The computer system of claim 10, wherein the processor is configured to determine to instruct the camera to adjust an encoding parameter for an encoding processing unit associated with the at least one of the first low interest area or the second low interest area, and wherein the instruction to decrease the bit rate of the video stream in the at least one of the first low interest area or the second low interest area includes an instruction to adjust the encoding parameter for the encoding processing unit associated with the at least one of the first low interest area or the second low interest area.

18. The computer system of claim 10, wherein the processor is further configured to:

associate an event type with a particular change in the historical gaze heat map;

detect an event of the associated event type; and change the first low interest area based on the particular change in the historical gaze heat map, in response to detecting the event.

19. A non-transitory computer-readable memory device storing instructions executable by a processor, the non-transitory computer-readable memory device comprising:

one or more instructions to receive a video stream from a camera;

one or more instructions to display the video stream on a display;

one or more instructions to obtain, via an eye tracking sensor, gaze information for an operator watching the display;

one or more instructions to generate a historical gaze heat map for the video stream for a time period based on the obtained gaze information, wherein generating the historical gaze heat map includes generating a value for a particular location in the video stream indicating how frequently an operator's gaze point fell on the particular location during the time period, wherein the time period is longer than a day;

one or more instructions to determine a first low interest area for a first time of day or day of week based on a historical gaze heat map generated for the first time of day or day of week over multiple instances of the first time of day or day of week;

one or more instructions to determine a second low interest area for a second time of day or day of week, wherein the second low interest area is different from the first low interest area based on a historical gaze heat map generated for the second time of day or day of week over multiple instances of the second time of day or day of week;

and one or more instructions to instruct the camera to decrease a bit rate of the video stream in at least one of the first low interest area or the second low interest area.

20. The non-transitory computer-readable memory device of claim 19, further comprising:

one or more instructions to determine a high interest area of the video stream based on the generated historical gaze heat map;

one or more instructions to instruct the camera to increase a bit rate of the video stream in the high interest area;

and wherein the one or more instructions to determine a low interest area of the video stream based on the generated historical gaze heat map further include:

one or more instructions to identity a pan, zoom, tilt, rotation, or image type setting for the camera;

one or more instructions to select a subset of the generated historical gaze heat map associated with the identified pan, zoom, tilt, rotation, or image type setting for the camera; and one or more instructions to determine a third low interest area of the video stream based on the selected subset of the generated historical gaze heat map.

* * * * *